Patented Sept. 3, 1929.

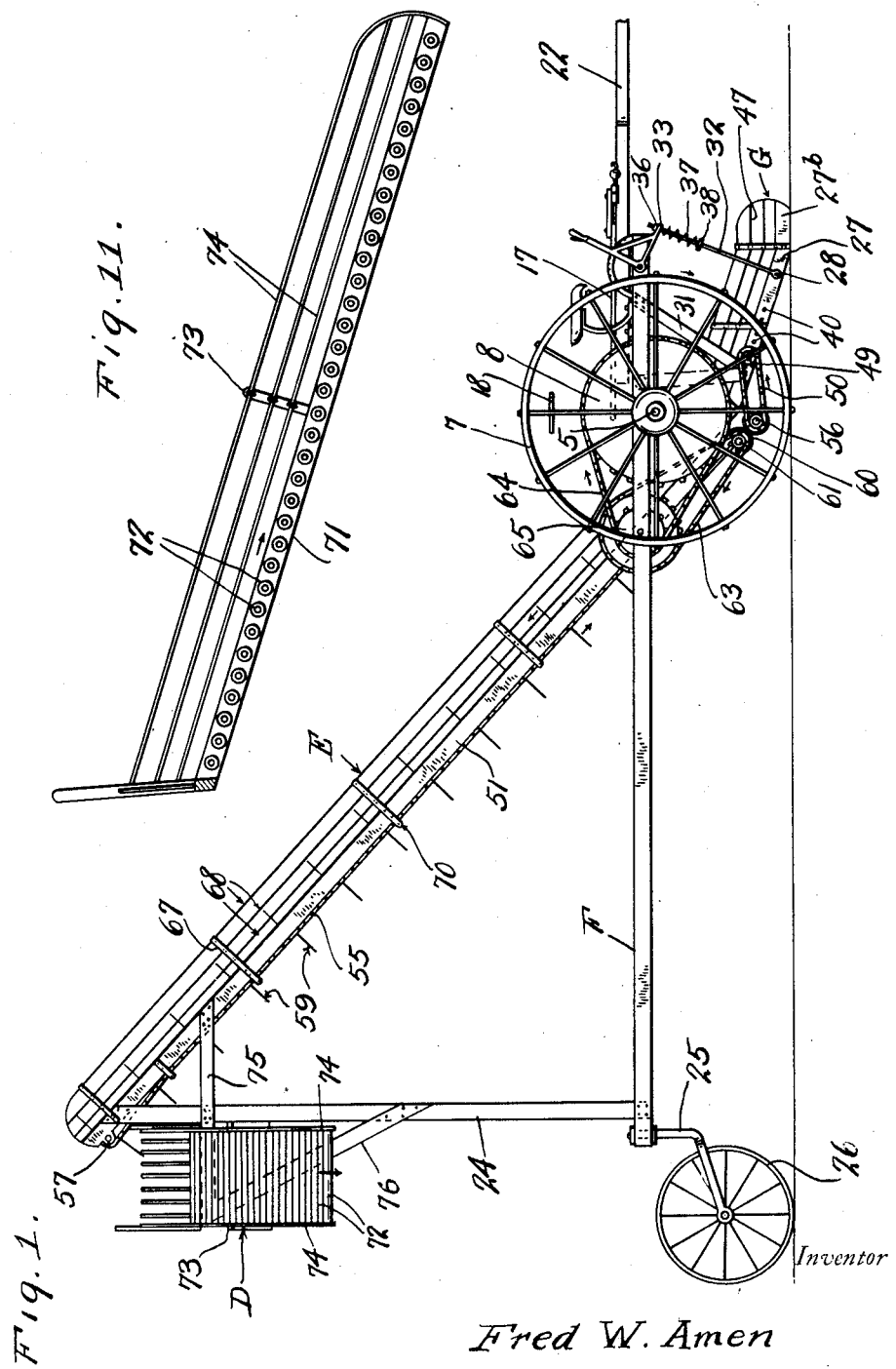

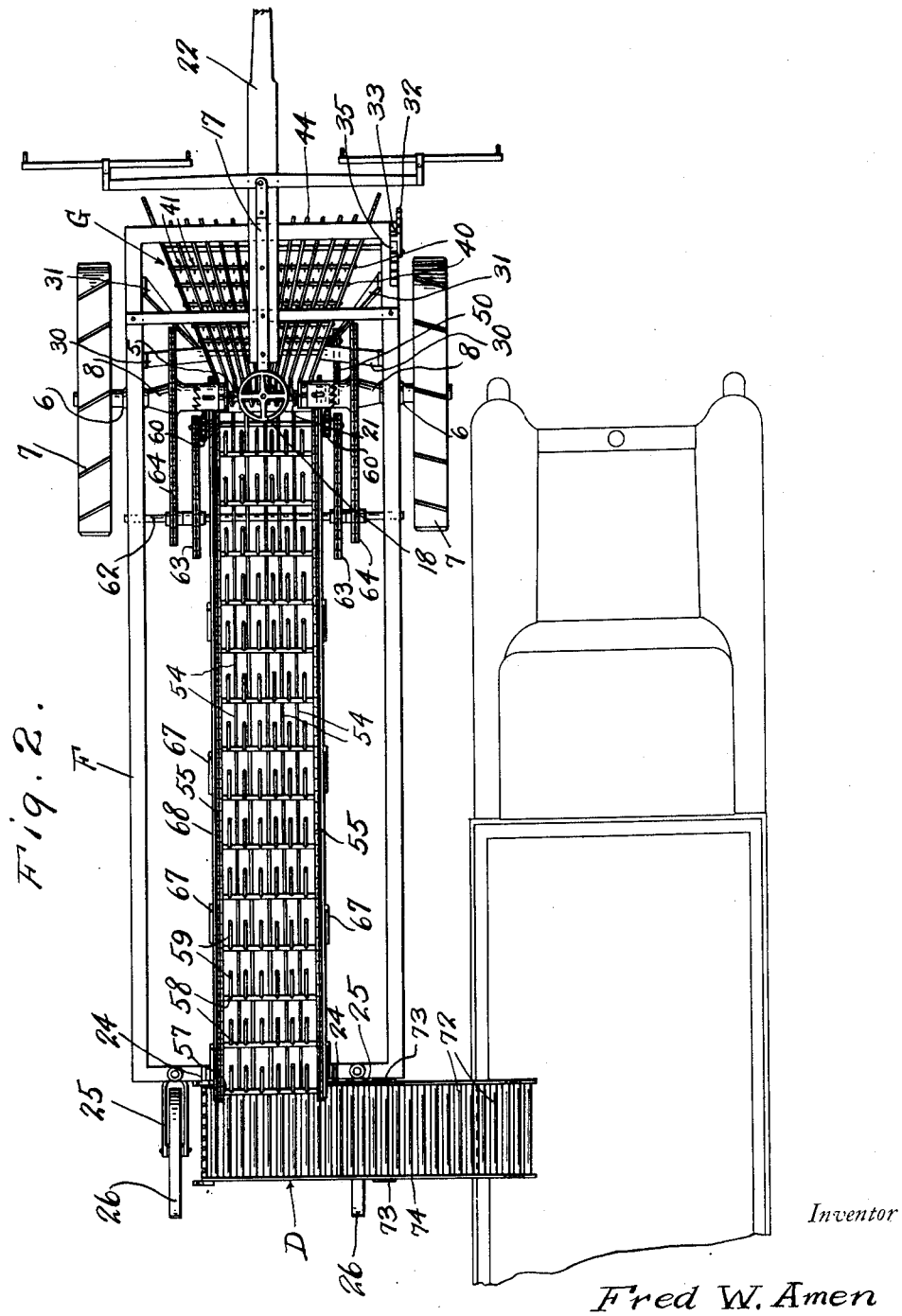

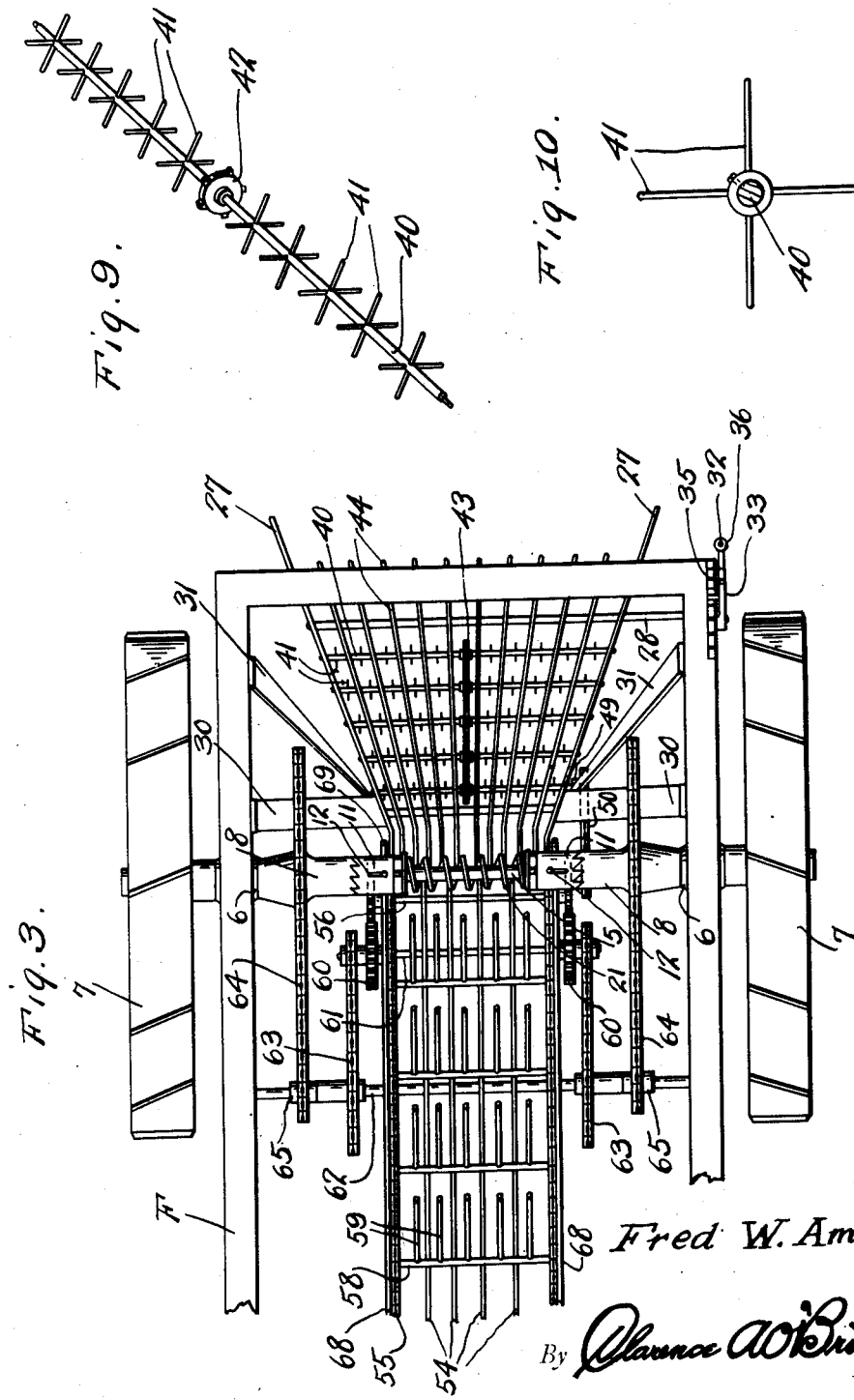

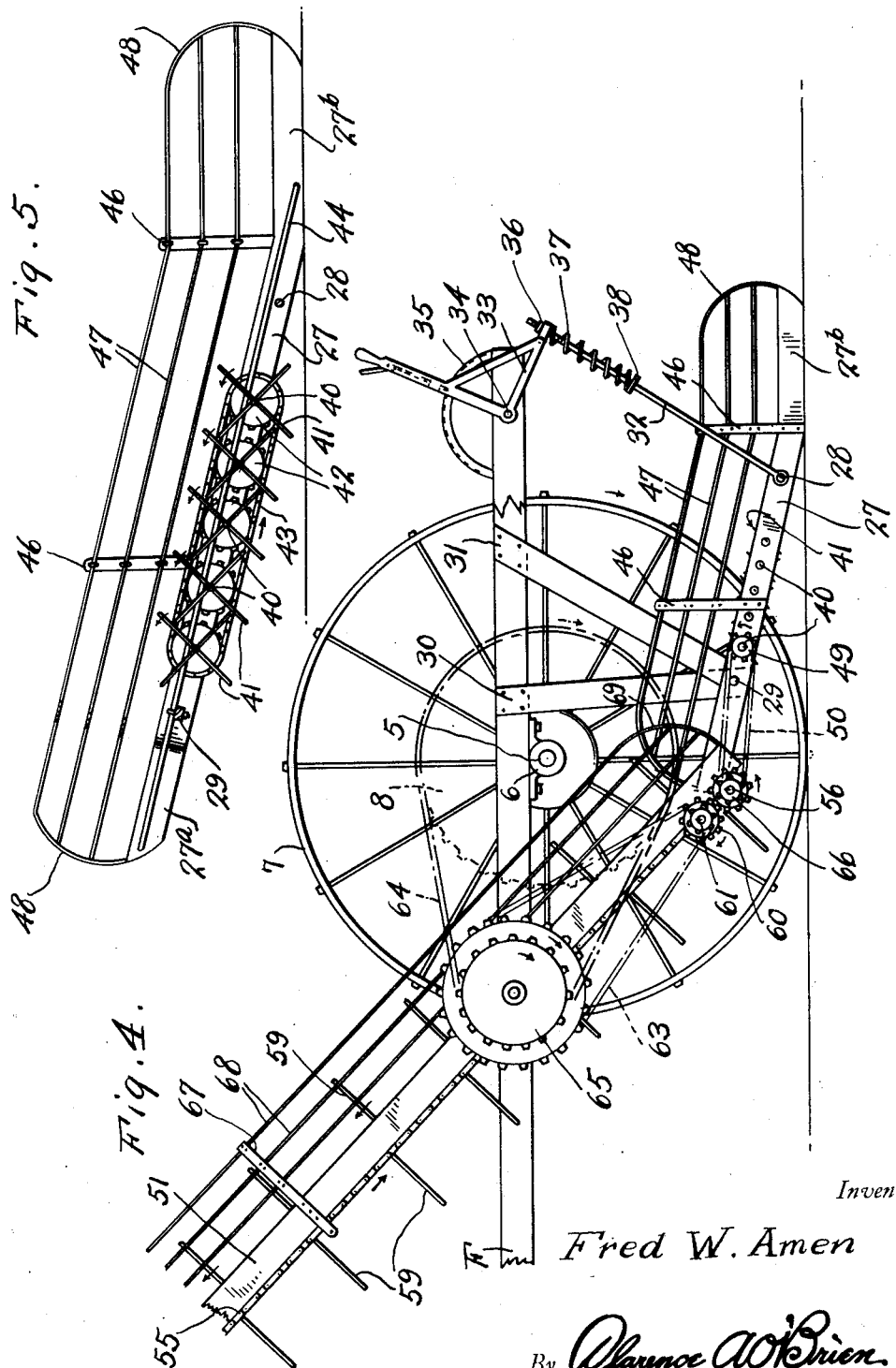

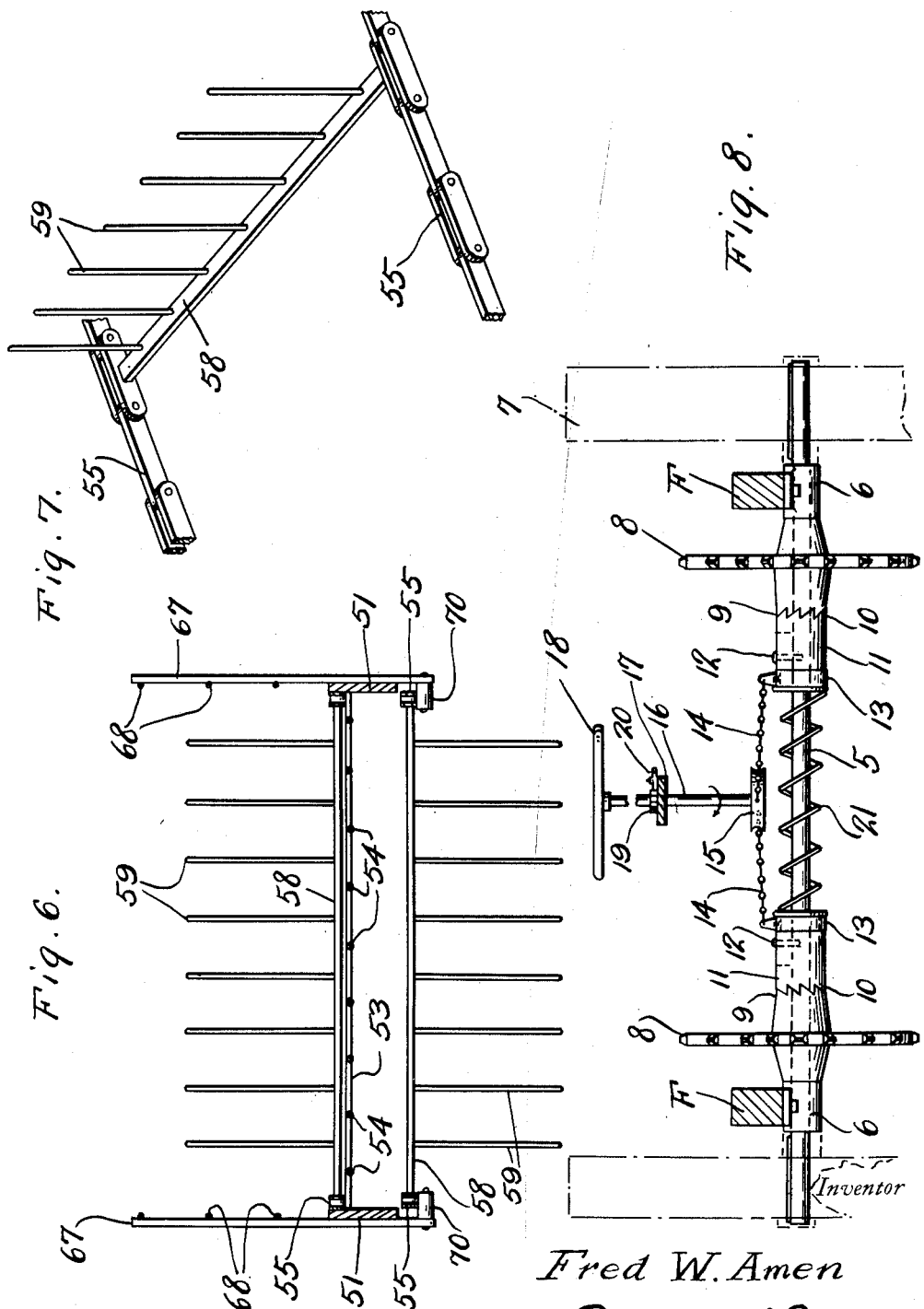

1,726,604

UNITED STATES PATENT OFFICE.

FRED W. AMEN, OF STERLING, COLORADO, ASSIGNOR OF ONE-THIRD TO JACOB AMEN AND ONE-THIRD TO DAVID AMEN, BOTH OF STERLING, COLORADO; W. J. SCHLEDE-WITZ ADMINISTRATOR OF SAID FRED W. AMEN, DECEASED.

BEET LOADER.

Application filed December 14, 1927. Serial No. 239,984.

The present invention relates to a beet loader and has for its principal object to provide a machine of this nature mounted on a wheeled frame and having means for gathering beets from the ground elevating them to a desired height and then dumping them to the side so that they may be deposited in a truck, receptacle or the like.

Another very important object of the invention resides in the provision of a mechanism of this nature wherein the gathering means may be moved toward and away from the ground.

Another very important object of the invention resides in the provision of a gathering mechanism which includes a plurality of rotating shafts with teeth radiating therefrom and a plurality of rods along which the teeth will move the beets.

Another very important object of the invention resides in the provision of a machine of this nature wherein the parts are located in respect to each other in a compact and convenient manner so that the structure is comparatively simple, and thoroughly efficient and reliable in operation.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the machine embodying the features of my invention, Figure 2 is a top plan view thereof, Figure 3 is an enlarged top plan view with the draft removed showing the forward portion of the machine, Figure 4 is an enlarged side elevation of the forward portion of the machine, Figure 5 is a longitudinal vertical section through the gathering mechanism, Figure 6 is a transverse vertical section through the elevating mechanism, Figure 7 is a detail perspective view showing a portion of the endless member of the elevating mechanism, Figure 8 is a transverse section through the frame showing the clutch and drive mechanism, Figure 9 is a perspective view of one of the rotary members of the gathering mechanism, Figure 10 is a transverse section therethrough, and Figure 11 is a longitudinal vertical section through the dumping mechanism.

Referring to the drawing in detail it will be seen that the letter F denotes a frame of substantially rectangular formation having an axle shaft 5 journaled across the forward portion thereof by means of bearings 6 and having wheels 7 keyed on the ends thereof. Sprockets 8 are rotatable on the shaft 5 between the sides of the frame and have clutch teeth 9 on the hubs thereof for engaging with similar clutch teeth 10 formed on a clutch sleeve 11 splined to the shaft by means of screws 12 and have collars 13 mounted thereon so that the sleeve may rotate freely therein. Chains 14 are connected to the collars 13 and are windable on a sheave 15. The sheave 15 is fixed to the lower end of a shaft 16 journaled through a bracket 17 and has a hand wheel 18 on the upper end thereof. A ratchet 19 is mounted on the shaft 16 and is engageable by a pivoted pawl 20. Obviously by winding the chains 14 on the sheave 15 the clutch sleeves 11 will be moved inwardly on the shaft 5 against the tension of a spring 21 and disengage their teeth 10 from the teeth 9 of the hubs of the sprockets 8. The pawl 20 will hold the parts in this position but as soon as the pawl is released the spring 21 will return the clutch sleeves to engaging position with respect to the hubs of the sprockets 8 for rotating said sprockets and the mechanisms operatively connected thereto which will be described as the description proceeds. A draft tongue 22 is mounted on the forward end of the frame F and projects forwardly therefrom. The bracket 17 extends from the rear end of the tongue 22.

On this frame F there are mounted a gathering mechanism G, an elevating mechanism E, and a dumping mechanism D.

The gathering mechanism G is disposed beneath the forward end of the frame F and the elevating mechanism E inclines upwardly and rearwardly from the rear end of the gathering mechanism G, extends through the frame F and is supported at its upper rear end by uprights 24. Yokes 25 are swivelly engaged on the rear end of the frame F and have journaled therein wheels 26.

Referring to the gathering mechanism G in detail it will be seen that the same comprises a pair of side bars 27 the major portions of which diverge forwardly from each other while the rear portions 27ᵃ are in substantial parallelism. The forward ends 27ᵇ are disposed normally horizontal while the remaining portions incline upwardly and rearwardly therefrom. A cross bar 28 connects the forward portions of the bars 27 while a cross bar 29 connects the rear portions thereof. The cross bar 29 extends through the extremities of hangers 30 and 31 depending from the frame F for rockably supporting the gathering mechanism. A link 32 is engaged with the bar 28 and is slidable through an extremity of the bell crank lever 33 rockable on the frame F as at 34 and having means 35 associated therewith for holding it in different adjusted positions. A nut 36 is mounted on the link 32 and a spring 37 is disposed on the link 32 between said extremity of the bell crank lever 33 and a stop 38 for resiliently urging the gathering mechanism toward the ground. Obviously by rocking the lever 33 rearwardly the forward end of the gathering mechanism may be raised from the ground. A plurality of shafts 40 are journaled transversely between the side bars 27 and have a plurality of fingers 41 radiating therefrom. On each shaft 40 there is fixed a sprocket 42. A chain 43 is trained over these sprockets for rotating the shafts in unison. A plurality of longitudinally extending rods 44 are fixed to the cross bar 29 and extend a distance rearwardly thereof and a distance forwardly thereof over the shafts 40 and over the cross rod 28. As is clearly indicated in Figure 3 the forward portions of these rods are mounted in respect to each other in a fan like formation.

Sides rise from the side bars 27 and each comprises a pair of posts 46 supporting longitudinal rods 47 conforming in shape with the side bars 27. The uppermost rod 47 has its ends curved downwardly as at 48 and welded or otherwise secured to the extremities of the other rods 47 and the extremities of the side bars 27. A sprocket 49 is fixed on the rearmost shaft 40 at one end thereof and is driven by a chain 50.

Referring now in detail to the elevating mechanism it will be seen that the numeral 51 denotes the side bars thereof which have their lower ends terminating outside of and adjacent the rear ends of the side bars 27 of the gathering mechanism. The upper ends of the side bars 51 are supported by the uprights 24. A plurality of cross rods 53 extend between the side bars 51 and support a plurality of longitudinal rods 54. A pair of chain and sprocket mechanisms 55 are connected to shafts 56 and 57. Cross rods 58 are mounted between the chains of the mechanisms 55 and have teeth 59 extending outwardly therefrom. Gearing 60 operatively connects shaft 56 with a shaft 61 journaled in the side bars 51. This shaft 61 is operatively connected with a shaft 62 journaled in the frame F by chain and sprocket mechanisms 63. Chains 64 are trained over sprockets 8 and sprockets 65 on the shaft 62. The chain 50 is trained over sprocket 66 on the shaft 56 and sprocket 49. The side bars 51 have sides rising therefrom consisting of posts 67 and longitudinal rods 68 the uppermost one of which has its ends curved downwardly as at 69 and welded or otherwise secured to the ends of the other rods 68 and to the ends of the side bars 51. The posts 67 extend a distance below the lower edge of the side bars 51 and have journaled on said lower ends rollers 70 for supporting the lower runs of the chains of the chain and sprocket mechanisms 55.

Referring now in detail to the dumping mechanism it will be seen that the same comprises a U-shaped frame 71 between the sides of which are journaled rollers 72 in close proximity to each other. Side fences rise from the sides of the frame 71 and also from the bight thereof and includes post 73 supporting rod 74. This dumping mechanism D is supported in a transverse inclined position below the upper rear end of the elevator mechanism E by means of horizontal bars 75 engaged with the side bars 51 and intermediate portions of the uprights 24, extending rearwardly therefrom and by rods 76 depending from the rear ends of the bars 75 and inclining inwardly and attached to intermediate portions of the upright 24.

From the above detailed description it will be seen that as the machine moves forwardly along the ground being pulled in any suitable manner, the rotation of the wheels 7 will rotate the axle shaft 5 so that when the clutch sleeves 11 are engaged with the hubs of the sprockets, said sprockets will impart movement to the chains 64 to rotate the shaft 62 which through the chain and sprocket mechanism 63 operates the shaft 61 and the elevating mechanism. The gearing 60 will cause the rotation of the shaft 56 which through chain 50 causes the operation of the gathering mechanism. The beets will be picked up from the ground by the gathering mechanism and moved rearwardly and upwardly by the fingers on the shafts 40 along the rods 44 to be deposited on the lower end of the elevating mechanism. The elevating mechanism through the upper runs of the chain and sprocket mechanisms thereof and the fingers 59 will slide the beets upwardly over rods 53 and 54 knocking all dirt therefrom and deposit the beets on the rollers 72 of the dumping mechanism. The beets in the dumping mechanism will gravitate downwardly to one side to be deposited in a truck, receptacle or the like.

It is thought that the construction, operation and advantages of the invention will now be clearly understood without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a beet loader, a wheeled frame, a gathering mechanism below the forward end of the frame, said gathering mechanism comprising a pair of upwardly and rearwardly inclined side bars diverging outwardly and forwardly with respect to each other, a plurality of longitudinally extending rods between the side bars, means for supporting said rods, a plurality of transverse shafts journaled between the side bars and over the rods, a plurality of teeth projecting from each shaft to swing between the rods, means operatively connecting the shafts together, and means operatively connecting the last mentioned means with the wheels of the frame.

2. A gathering mechanism for a loader comprising a pair of side bars inclining upwardly and rearwardly and diverging forwardly from each other, a plurality of shafts journaled between the side bars, means operatively connecting the shafts, means for rotating the shafts, fingers radiating from the shafts, a plurality of longitudinally extending rods between the side bars, and means for supporting said rods between the side bars to extend below the shaft.

In testimony whereof I affix my signature.

FRED W. AMEN.